(12) United States Patent
Arbak

(10) Patent No.: US 11,009,082 B2
(45) Date of Patent: May 18, 2021

(54) METHOD FOR PRODUCING A SYNCHRONIZER RING AND ASSOCIATED SYNCHRONIZER RING

(71) Applicant: DIEHL METALL STIFTUNG & CO. KG, Roethenbach (DE)

(72) Inventor: Murat Arbak, Lauf An der Pegnitz (DE)

(73) Assignee: Diehl Metall Stiftung & Co. KG, Roethenbach (DE)

( * ) Notice: Subject to any disclaimer, the term of this patent is extended or adjusted under 35 U.S.C. 154(b) by 330 days.

(21) Appl. No.: 16/051,942

(22) Filed: Aug. 1, 2018

(65) Prior Publication Data

US 2019/0055994 A1  Feb. 21, 2019

(30) Foreign Application Priority Data

Aug. 19, 2017  (DE) .......................... 102017007892.0

(51) Int. Cl.
  *F16D 23/02*  (2006.01)
  *B21K 1/76*  (2006.01)
  *F16D 69/00*  (2006.01)

(52) U.S. Cl.
  CPC ............ *F16D 23/025* (2013.01); *B21K 1/761* (2013.01); *F16D 2069/004* (2013.01); *F16D 2250/00* (2013.01); *F16D 2250/0023* (2013.01); *F16D 2300/10* (2013.01)

(58) Field of Classification Search
  CPC ........ F16D 23/025; F16D 23/02; F16D 23/04; F16D 2250/0023; F16D 2069/004; F16D 2300/10
  See application file for complete search history.

(56) References Cited

U.S. PATENT DOCUMENTS

| 3,578,122 A | * | 5/1971 | Magnier ............... F16D 23/025 |
| | | | 192/107 R |
| 4,679,681 A | * | 7/1987 | Creydt .................. F16D 23/025 |
| | | | 192/107 M |
| 5,582,281 A | * | 12/1996 | Nakashima ............ B21K 25/00 |
| | | | 148/532 |
| 2015/0354638 A1 | | 12/2015 | Negele |

FOREIGN PATENT DOCUMENTS

| DE | 3801501 A1 | 8/1989 |
| DE | 102006056487 A1 | 6/2008 |
| DE | 102009026192 B3 | 7/2010 |
| FR | 1535343 A  * | 8/1968 ............. F16D 23/06 |
| FR | 1535343 A | 8/1968 |
| JP | 2008261382 A * | 10/2008 |

OTHER PUBLICATIONS

Machine translation of FR 1535343, 3 Pages. (Year: 1968).*
Machine translation of JP 2008-261382, 9 Pages. (Year: 2008).*

* cited by examiner

*Primary Examiner* — Gregory D Swiatocha
(74) *Attorney, Agent, or Firm* — Laurence A. Greenberg; Werner H. Stemer; Ralph E. Locher

(57) ABSTRACT

A method produces a synchronizer ring for a synchronizing device in which blocking teeth extending radially outwards or radially inwards are produced by a forging method. The blocking teeth each have a flank portion and two oblique top flanks merging into a common top ridge. A depression is formed on the rear side of a blocking tooth opposite the top ridge.

10 Claims, 4 Drawing Sheets

METHOD FOR PRODUCING A SYNCHRONIZER RING AND ASSOCIATED SYNCHRONIZER RING

CROSS-REFERENCE TO RELATED APPLICATION

This application claims the priority, under 35 U.S.C. § 119, of German application DE 10 2017 007 892.0, filed Aug. 19, 2017; the prior application is herewith incorporated by reference in its entirety.

BACKGROUND OF THE INVENTION

Field of the Invention

The invention relates to a method for producing a synchronizer ring for a synchronizing device, in which blocking teeth extending radially outwards or radially inwards are produced by a forging method. The blocking teeth each have a flank portion and two oblique top flanks merging into a common top ridge.

Synchronizing devices are component parts of manual and automated manual transmissions for motor vehicles. A synchronizer ring is used in a shifting operation to match the rotational speeds of a sliding collar and of a gearwheel of a selected gear to one another by producing friction. When both components have the same speed of rotation, the sliding collar can be moved axially, thereby engaging the desired gear.

Synchronizer rings can be produced by cold forging a steel sheet or by hot forging a brass blank or by sintering or sinter forging. In this case, the desired contour is produced in several steps in a progressive tool or in a transfer tool (fundamentally only in the case of cold forging). At the end of the forming process, die filling takes place in the region of the top ridge of the blocking teeth. The blocking teeth have a flank portion and two oblique top flanks merging into a common top ridge. In practice, complete die filling in the region of the top ridge is not possible. Therefore, conventional synchronizer rings always have a top ridge, i.e. a top ridge surface, which has a certain ridge width. Moreover, radii are formed on both top flanks. The ridge width is dependent on many influencing parameters, e.g. the material used, the sheet metal thickness in the case of a synchronizer ring produced from steel sheet, the tooth geometry and, in particular, the angle of the top flanks. Moreover, friction and the temperature also have an effect on the width of the top ridge during forming. To enable the synchronizer ring to perform its function, a certain width of the top ridge must not be exceeded. A sharp edge between the two top flanks, i.e. a top ridge with a width approaching zero, would be desirable.

The width of the top ridge is dependent on the thickness of the sheet metal. In general, the aim is to reduce the thickness of the sheet metal. It is possible to reduce the thickness of the sheet metal for other functional elements of a synchronizer ring. The limiting factor here, however, is the blocking tooth geometry required for functioning, in particular the requirement for a certain tooth height. This required tooth height determines the minimum sheet-metal thickness of the steel sheet from which the synchronizer ring is produced.

SUMMARY OF THE INVENTION

It is therefore the underlying object of the invention to specify a method for producing a synchronizer ring in which steel sheet with a reduced thickness can be used without resulting in limitations on the functionality of the synchronizer ring.

To achieve this object, provision is made, according to the invention, in a method of the type stated at the outset, for a depression to be formed on the rear side of a blocking tooth opposite the top ridge. This is preferably accomplished by stamping the desired shape.

The invention is based on the realization that stamping the depression in the rear side of the blocking tooth during the forming process makes it possible to achieve a material flow in the direction of the top of the tooth consisting of the top flanks and the top ridge, thereby improving die filling by the top ridge.

In contrast, the required die filling has hitherto been achieved by expensive optimization of the stamping and punching processes. For example, the blocking teeth were selectively stamped so as to be longer, after which the final geometry was punched. However, for this it was necessary to use a blank, in particular a steel sheet or a circular blank, with a minimum thickness, while this minimum thickness was not necessary for the other components of the synchronizer ring, e.g. for the ring surface (see reference numeral 5 in FIG. 1) and for the collar (see reference numeral 6 in FIG. 1).

In the context of the invention, it has been observed that stamping the depression makes it possible to produce a material flow in the direction of the top ridge, as a result of which the required top height is obtained. The advantage of the method according to the invention is to be seen in the fact that improved die filling is achieved in the region of the top ridge. Moreover, the forming process is robust, even with an unfavorable combination of influencing parameters, including a lubricant used, material properties of the blank, punching quality etc. By means of the method according to the invention, it is possible to produce a synchronizer ring from a metal sheet which has a lower thickness, as a result of which there is a reduction in weight.

One variant of the method according to the invention envisages that an at least approximately hemi-spherical or spherical cup-shaped depression is stamped. This depression is stamped in the rear side of the blocking tooth, i.e. in the opposite side from the top ridge.

An alternative configuration of the method according to the invention envisages that a drop-shaped depression is stamped, which is spherically shaped at one end and pointed in shape at the other end, wherein the pointed end is oriented radially inwards. The depression thus has the shape of half a drop. Alternatively, it is also possible to provide for a drop-shaped depression to be stamped, which is spherically shaped at one end and pointed in shape at the other end, wherein the pointed end is oriented radially outwards.

Another variant of the method according to the invention envisages that a depression is stamped, the axial extent of which increases radially outwards. The depression can extend in the radially outer half of a collar surface of the synchronizer ring, for example.

One alternative envisages that a depression is stamped which is designed as a groove extending in the radial direction. The groove can thus extend in the radial direction over the entire length. The depth of the groove can preferably increase radially outwards. The groove can preferably have a rectangular or triangular or semicircular cross section (in a plan view of the front end of the blocking tooth or in a radial direction of view).

In the method according to the invention, it is particularly preferred if the synchronizer ring is produced from a metal sheet, the thickness of which is 1.5 mm to 3.0 mm, preferably 1.6 mm to 1.9 mm.

In addition, the invention relates to a synchronizer ring for a synchronizing device, which has blocking teeth which are produced by a forging method, which extend radially outwards or radially inwards and which each have a flank portion and two oblique top flanks merging into a common top ridge.

The synchronizer ring according to the invention is distinguished by the fact that a depression is stamped on the rear side of a blocking tooth opposite the top flank.

The synchronizer ring according to the invention is preferably produced by a method of the type described.

In the case of the synchronizer ring according to the invention, it is preferred if it has one of the following depressions:

a) a depression designed at least approximately as a hemisphere or spherical cup;
b) a drop-shaped depression, which is spherically shaped at one end and pointed in shape at the other end, wherein the pointed end is oriented either radially inwards or radially outwards;
c) a depression, the axial extent of which increases radially outwards; and
d) a depression which is designed as a groove extending in the radial direction, wherein the depth of the groove preferably increases radially outwards.

A preferred embodiment of the synchronizer ring according to the invention envisages that the maximum depth of the depressions is 0.3 mm to 1.2 mm, preferably about 0.6 mm.

Other features which are considered as characteristic for the invention are set forth in the appended claims.

Although the invention is illustrated and described herein as embodied in a method for producing a synchronizer ring and an associated synchronizer ring, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
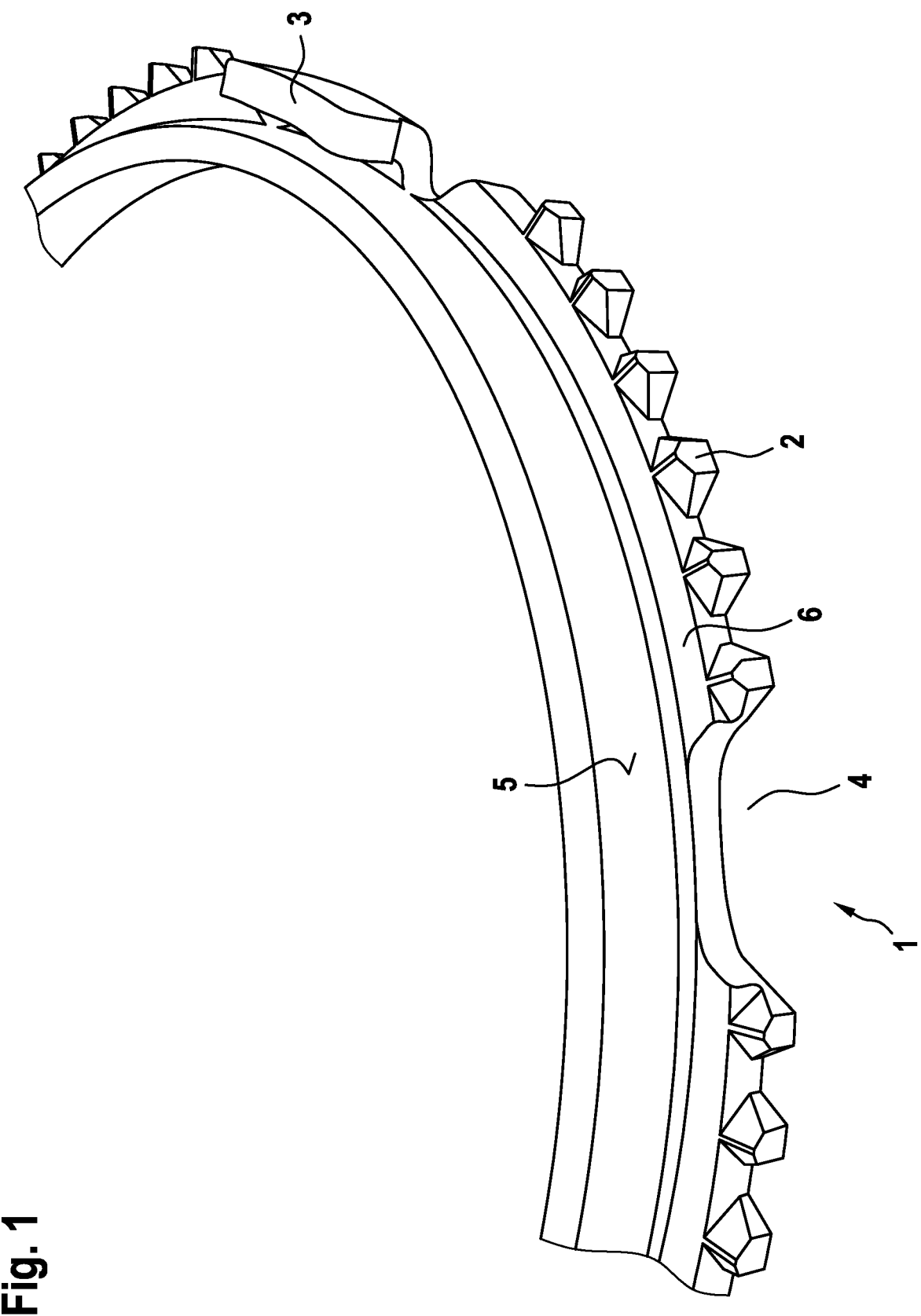
FIG. 1 is a diagrammatic, perspective view of a section of a synchronizer ring produced by the method according to the invention.

Referring now to the figures of the drawings in detail and first, particularly to FIG. 1 thereof, there is shown a section of a synchronizer ring 1 which is produced by a forging method, in the course of which blocking teeth 2 extending radially outwards or radially inwards are formed. The synchronizer ring 1 has a plurality of index tabs 3, which are distributed over the circumference, and recesses 4. A collar 6 extending in the radial direction adjoins an annular surface 5 extending in the axial direction. The collar 6 has the blocking teeth 2 spaced apart from each other in the circumferential direction. In the enlarged view in FIG. 2, it can be seen that the blocking tooth 2 has a flank portion 7, adjoining which are two oblique top flanks 8, 9, which slope relative to one another and merge into a top ridge 10. The top ridge 10 is a flat surface (depending on the width; a flat surface if there is sufficient width), which is preferably situated in the plane defined by the collar 6.

Figure 2:
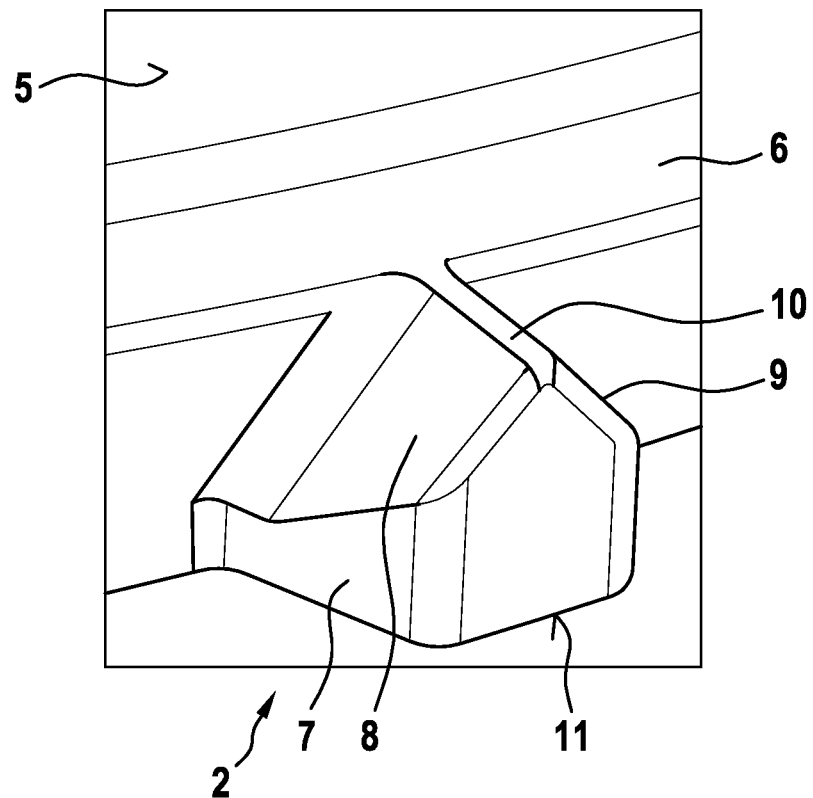
FIG. 2 is an enlarged, perspective view of a blocking tooth of the synchronizer ring in FIG. 1.

In the illustrative embodiment shown, the synchronizer ring 1 is produced by cold forging a steel sheet, which is initially bent into a round blank and punched and pressed in several steps. The top ridge 10 shown in FIG. 2 is unwanted or the aim is to produce a top ridge with the minimum possible width, giving rise to a sharp edge between the two top flanks 8, 9. In order to ensure that as great as possible die filling is achieved in the region of the top ridge during the forming process, a depression is stamped in a rear side 11 of the blocking tooth 2, the side opposite the top ridge 10.

Figure 3:
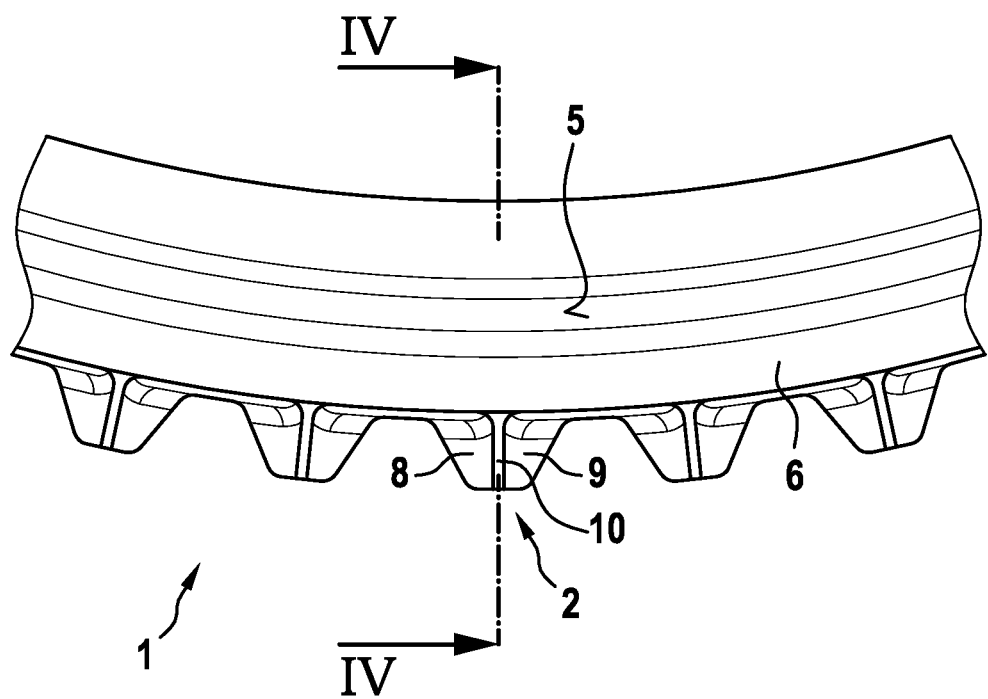
FIG. 3 is a plan view of a section of the synchronizer ring in FIG. 1.

FIG. 3 shows the synchronizer ring 1 with the blocking teeth 2, the mutually opposite top flanks 8, 9 and the top ridge 10 in a plan view.

Figure 4:
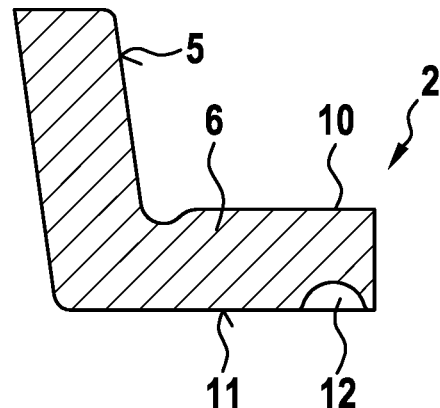
FIG. 4 is a sectional view taken along the line IV-IV in FIG. 3.

FIG. 4 is a sectioned view along the line IV-IV in FIG. 3. In FIG. 4, it can be seen that a depression 12 is stamped in the rear side 11 of the blocking tooth 2, the side being opposite the top ridge 10. In the illustrative embodiment shown, the depression 12 is of at least approximately spherical cup-shaped design. The step of stamping the depressions 12 can be carried out before the step of stamping the top flanks 8, 9. However, it is also possible to produce the depression 12 and the top flanks 8, 9 simultaneously or even subsequently in a final stamping or forming step.

The stamped depression 12 brings about a material flow towards the top ridge 10 during the forming process, as a result of which the height of the top formed by the top flanks 8, 9 and the top ridge 10 reaches the required level.

In contrast, conventional synchronizer rings have a solid blocking tooth. Reducing the sheet metal thickness used to produce the synchronizer ring to below a certain value is not possible with a conventional method since otherwise the required height of the blocking teeth cannot be achieved.

According to the method described, the depression 12 formed in the rear side 11 of the blocking tooth 2 brings about improved die filling in the region of the top ridge 10, with the result that the ridge has a minimum width.

In the illustrative embodiment shown, the synchronizer ring 1 is produced from steel sheet with a thickness of 1.8 mm, whereas conventional synchronizer rings require a sheet metal thickness of 2.2 mm, for example. The advantage of the method described can also be regarded as the fact that the robustness of the forming process is increased by the stamped depressions, with the result that other influencing variables, such as lubricants, punching quality, temperature or frictional forces do not have a significant effect on the quality of the synchronizer ring produced.

Figure 5:
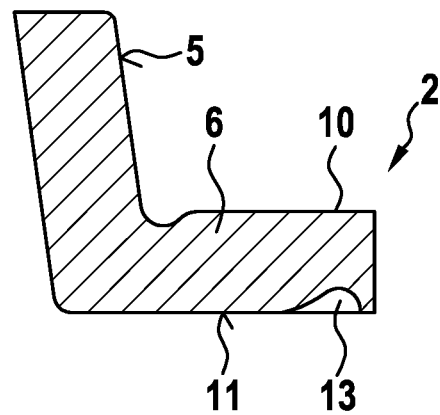
FIG. 5 is a sectional view similar to FIG. 4 with a depression of different design.

FIG. 5 is a sectioned view similar to FIG. 4 and shows another illustrative embodiment of a synchronizer ring, which has a depression 13 on the rear side 11 of the blocking tooth 2. The depression 13 is of drop-shaped design and has a spherical end and an opposite, pointed end. The pointed end is oriented radially inwards. As shown in FIG. 5, depression 13 has the shape of half a drop.

Figure 6:
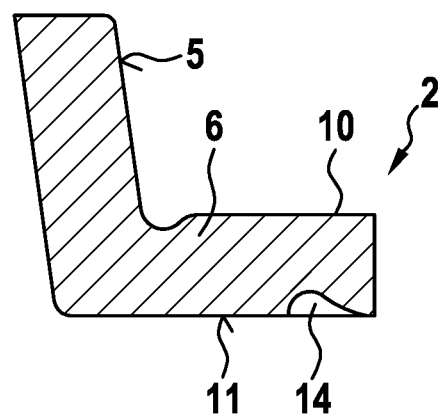
FIG. 6 is a sectional view of another illustrative embodiment of the depression.

FIG. 6 is a sectioned view similar to FIG. 5 and shows a depression 14 which has the same "half-drop shape" as the depression 13 in FIG. 5. However, the pointed end is oriented radially outwards, while the spherical end faces radially inwards. As in the illustrative embodiments above, the drop-shaped depression 14 causes a material flow towards the top ridge 10 during the forming process.

Figure 7:
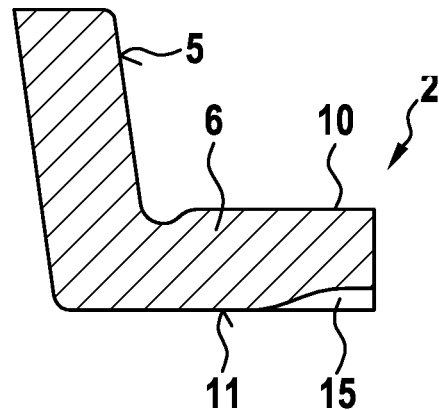
FIG. 7 is another illustrative embodiment of the depression.

FIG. 7 is a sectioned view of another illustrative embodiment of a synchronizer ring 1. On the rear side 11 there is a depression 15, the depth of which increases radially outwards in the axial direction along a curved path. The depression 15 extends as far as the radially outer end of the blocking tooth 2.

Figure 8:
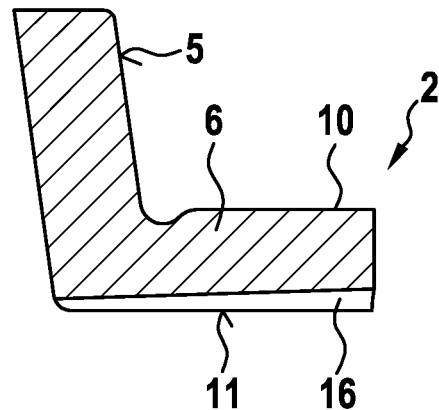
FIG. 8 is another illustrative embodiment of the depression.

FIG. 8 is a sectioned view of another illustrative embodiment of a blocking tooth 2, in the rear side 11 of which a depression 16 is stamped, which is configured as a groove extending in the radial direction. In FIG. 8, it can be seen that the depth of the groove increases radially outwards. In this illustrative embodiment, the groove-shaped depression 16 has an at least approximately hemi-spherical cross section. The depression 16 also causes the desired material flow towards the top ridge 10 during the forming process, thereby resulting in particularly good die filling.

Figure 9:
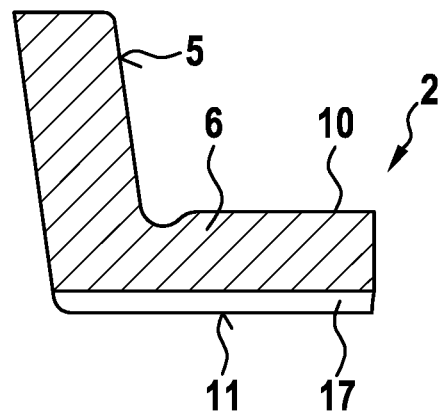
FIG. 9 is another illustrative embodiment of the depression.

FIG. 9 is a sectioned view of an illustrative embodiment similar to that in FIG. 8. As in the preceding illustrative embodiment, a depression 17 is configured as a groove, the depth of which is constant. The groove-shaped depression 17 preferably has a rectangular or triangular or semicircular cross section (in a plan view of the front end of the blocking tooth or in a radial direction of view).

The following is a summary list of reference numerals and the corresponding structure used in the above description of the invention:
1 synchronizer ring
2 blocking tooth
3 index tabs
4 recess
5 annular surface
6 collar
7 flank portion
8, 9 top flank
10 top ridge
11 rear side
12 depression
13 depression
14 depression
15 depression
16 depression
17 depression

The invention claimed is:

1. A method for producing a synchronizer ring for a synchronizing device, which comprises the steps of:
producing blocking teeth extending radially outwards from the synchronizer ring, the blocking teeth each having a flank portion and two oblique top flanks merging into a common top ridge; and
forming a depression on a rear side of a blocking tooth of said blocking teeth opposite the common top ridge by stamping the depression as a drop-shaped depression in the blocking tooth and the drop-shaped depression being spherically shaped at a first end and pointed in shape at a second end, wherein the second end being pointed in shape is oriented radially inwards.

2. The method according to claim 1, which further comprises producing the synchronizer ring from a metal sheet having a thickness in a range of 1.5 mm to 3.0 mm.

3. The method according to claim 1, which further comprises producing the synchronizer ring from a metal sheet having a thickness in a range of 1.6 mm to 1.9 mm.

4. A method for producing a synchronizer ring for a synchronizing device, which comprises the steps of:
producing blocking teeth extending radially outwards from the synchronizer ring, the blocking teeth each having a flank portion and two oblique top flanks merging into a common top ridge; and
forming a depression on a rear side of a blocking tooth of said blocking teeth opposite the common top ridge by stamping the depression as a drop-shaped depression in the blocking tooth, the drop-shaped depression is spherically shaped at a first end and pointed in shape at a second end, wherein the pointed in shape end is oriented radially outwards.

5. A synchronizer ring for a synchronizing device, comprising:
blocking teeth produced by a forging method and extending radially outwards from the synchronizer ring and each of said blocking teeth having a flank portion and two oblique top flanks merging into a common top ridge; and
a blocking tooth of said blocking teeth having a rear side with a depression formed therein opposite at least one of said oblique top flanks, said depression being a drop-shaped depression in said blocking tooth and said drop-shaped depression being spherically shaped at a first end and pointed in shape at a second end, wherein said second end being pointed in shape is oriented radially inwards.

6. The synchronizer ring according to claim 5, wherein said depression has a maximum depth of 0.3 mm to 1.2 mm.

7. The synchronizer ring according to claim 5, wherein said depression has a maximum depth of about 0.6 mm.

8. The synchronizer ring according to claim 5, wherein the synchronizer ring is produced from metal sheet having a thickness in a range of 1.5 mm to 3.0 mm.

9. The synchronizer ring according to claim 8, wherein the range of the thickness is 1.6 mm to 1.9 mm.

10. A synchronizer ring for a synchronizing device, comprising:
blocking teeth produced by a forging method and extending radially outwards from the synchronizer ring and each of said blocking teeth having a flank portion and two oblique top flanks merging into a common top ridge; and
a blocking tooth of said blocking teeth having a rear side with a depression formed therein opposite at least one of said oblique top flanks, said depression being formed as a drop-shaped depression in said blocking tooth, said drop-shaped depression is spherically shaped at a first end and pointed in shape at a second end, wherein said second end being pointed in shape is oriented radially outwards.

* * * * *